United States Patent
Srinivasan

(10) Patent No.: US 7,490,184 B2
(45) Date of Patent: Feb. 10, 2009

(54) SYSTEMS AND METHODS FOR DATA INTERVENTION FOR OUT-OF-ORDER CASTOUTS

(75) Inventor: Prasanna Srinivasan, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 11/147,941

(22) Filed: Jun. 8, 2005

(65) Prior Publication Data

US 2006/0282587 A1 Dec. 14, 2006

(51) Int. Cl.
G06F 13/00 (2006.01)
(52) U.S. Cl. ................... 710/112; 711/143
(58) Field of Classification Search ............ 710/107, 710/112; 711/141, 143, 146
See application file for complete search history.

(56) References Cited

U.S. PATENT DOCUMENTS

| 6,349,367 | B1 | 2/2002 | Arimilli et al. |
| 6,484,240 | B1 * | 11/2002 | Cypher et al. ............ 711/141 |
| 6,502,171 | B1 | 12/2002 | Arimilli et al. |
| 6,615,323 | B1 | 9/2003 | Petersen et al. |
| 6,785,779 | B2 * | 8/2004 | Berg et al. ................ 711/146 |
| 6,901,495 | B2 * | 5/2005 | Cypher .................... 711/167 |
| 7,149,852 | B2 * | 12/2006 | Van Doren et al. ........ 711/141 |
| 2003/0009637 | A1 | 1/2003 | Arimilli et al. |
| 2003/0204680 | A1 | 10/2003 | Hardage, Jr. |
| 2006/0294525 | A1 * | 12/2006 | Rowlands ................. 718/104 |

* cited by examiner

Primary Examiner—Clifford H Knoll
(74) Attorney, Agent, or Firm—Joscelyn G. Cockburn; Schubert Osterrieder & Nickelson PLLS

(57) ABSTRACT

Systems and methods for data intervention for out-of-order castouts are disclosed. Embodiments provide for transmitting snoopable requests received from one or more requesting devices to one or more snoopable devices, which may include requesting devices. Each snoopable device receives snoopable requests and determines if it holds the requested data in modified state. If so then the data is castout and transferred directly to the requesting device without waiting for the data to be read from the slave that was the target of the request. The order of transfers is arbitrated to be consistent with an order of received requests.

15 Claims, 3 Drawing Sheets

SYSTEMS AND METHODS FOR DATA INTERVENTION FOR OUT-OF-ORDER CASTOUTS

FIELD

The present invention is in the field of digital processing. More particularly, the invention is in the field of handling cast out requests in a digital system with multiple masters, a shared bus, and a common memory.

BACKGROUND

Recent advances in silicon densities allow for the integration of numerous functions onto a single silicon chip. With this increased density, peripheral devices formerly attached to a processor at the card level are integrated onto the same die as the processor. This type of implementation of a complex circuit on a single die is referred to as a system-on-a-chip (SOC). With a proliferation of highly integrated system-on-a-chip designs, the shared bus architecture that allows major functional units to communicate is commonly utilized. There are many different shared bus designs which fit into a few distinct topographies. A known approach in shared bus topography is for multiple masters to present requests to an arbiter of the shared bus for accessing an address range of an address space, such as an address space of a given slave device. The arbiter awards bus control to the highest priority request based on a request prioritization algorithm. As an example, a shared bus may include a Processor Local Bus that may be part of a CoreConnect bus architecture of International Business Machines Corporation (IBM).

Thus, a system-on-a-chip or Ultra Large Scale Integration (ULSI) design, typically comprises multiple masters and slave devices connected through the Processor Local Bus (PLB). The PLB consists of a PLB core (arbiter, control and gating logic) to which masters and slaves are attached. The PLB architecture typically supports up to 16 masters. A master can perform read and write operations at the same time in an address-pipelined architecture, because the PLB architecture has separate read and write buses. However, the PLB architecture cannot initiate requests for both a read and a write at the same time. In a given system-on-a-chip (SOC) application, PLB bus utilization can be improved using the overlapped read and write transfer feature of the PLB architecture.

As mentioned, one example of a bus utilized by SOC computer systems is the CoreConnect. TM PLB. In an SOC with this PLB architecture, each device attaches to a central resource called the "PLB Macro". The PLB Macro is a block of logic that acts as the bus controller, interconnecting all the devices (masters/slaves) of the SOC. The PLB Macro primarily includes arbitration functions, routing logic, buffering and registering logic. The devices communicate over the bus via a PLB protocol in a synchronous manner. The protocol includes rules that control how transmission processes are to be completed, including, for example, the number of clock cycles taken to perform certain sequences. Among these sequences are (1) the time from a request at the initiating device to a snoop result at the initiating device, and (2) the time from read data at a source device (the target) to read data at the destination device (the initiator), etc.

In a typical architecture that includes a PLB, each master is in electrical communication with the PLB core via at least one dedicated port or line. The multiple slaves in turn, are connected to the PLB core via a PLB shared data bus and a command bus allowing each master to communicate with each slave connected to the PLB shared data bus and the command bus. Each slave has address, which allows a master to select and communicate with a particular slave among the plurality of slaves. When a master wants to communicate with the particular slave, the master sends certain information to the PLB core for distribution to the slaves. An example of this information is the selected bus command, the write_data command and the address of the slave.

If the slave address sent by the master matches the address of a slave, then that slave has been selected and the action requested by the master is performed. Because each slave has a unique address, multiple slave selections in a single request by one master are prevented and each slave can only be accessed by one master at a time. In the case where multiple masters are making requests to the same targeted slave, the PLB core includes an arbiter circuit which determines request priority based on a predetermined priority level or priority scheme.

When a slave is selected by a master, the selected slave will capture the address information sent by the master and the slave will send a status signal back to the PLB core, and hence to the requesting master. In addition, the selected slave will also communicate slave results and other information to the PLB core, and hence, to the master. A status signal from each slave is communicated to the arbiter. These status signals typically include a re-arbitrate request signal, which is a request for a slave to the arbiter to re-arbitrate the bus because the slave was unable to perform the requested function. Status signals also include a wait signal which informs the arbiter to wait for the latching of the incoming address needed for the current command execution before continuing. Status signals also include a write complete signal, which informs the arbiter that the write operation has been completed.

Complications can arise when the data at an address in system memory is not as up-to-date as data in a processor's cache. Consider a situation where a first processor issues a request to read a value from memory. It may occur that a second processor has internally updated that value and stored the updated value in its internal cache. This renders the value in memory old and therefore invalid. Conventionally, the updated value from the second processor is transferred to the first processor in two steps: first, the updated value from the second processor is copied to memory. Then the valued is copied from memory to the internal cache of the first processor. This takes a relatively long time. There is a need to reduce this memory latency.

SUMMARY

The problems identified above are in large part addressed by systems and methods disclosed herein for. Embodiments include an integrated circuit comprising one or more requesting devices, each adapted to request to read data from a source device in the integrated circuit. The circuit includes one or more snoopable devices, each adapted to determine if it holds requested data in a modified state. Circuitry is provided to receive a request from a requesting device to read data from a source device and to communicate the request to the at least one snoopable devices. Circuitry receives requested data in a modified state from a snoopable device if the snoopable device determines that it holds the requested data in a modified state. The circuitry transfers the requested data in a modified state to the device that requested the data without waiting for the data to be read from the source device from which data was requested.

Embodiments include a system on a chip, comprising a first device to submit requests to read data from a source device. The system includes a second device adapted to determine if it holds data requested by a read request from the first device in a modified state. A third device transfers data in a modified state from the second device to the first device without waiting for the requested data to be read from the source device. The first device may be adapted to determine if it holds data requested by the second device in a modified state and the second device may be adapted to submit requests to read data from the source device. Further, the system may comprise an arbitrator to determine an order of transfer by the third device as a function of the order of requests received by the first device.

Another embodiment is a method for handling transfer of data from a source device to a requesting device in an integrated circuit. The method comprises receiving a request from the requesting device to read data from the source device. The request is communicated to one or more devices in the integrated circuit, so that the one or more devices may each determine if it holds the requested data in a modified state. Data is transferred from a device holding the requested data in a modified state to the requesting device without waiting for the data to be read from the source device.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems and methods for data intervention for out-of-order castouts are disclosed. Embodiments provide for transmitting snoopable requests received from one or more requesting devices to one or more snoopable devices, which may include requesting devices. Each snoopable device receives snoopable requests and determines if it holds the requested data in modified state. If so then the data is castout and transferred directly to the requesting device without waiting for the data to be read from the slave that was the target of the request. The order of transfers is arbitrated to be consistent with an order of received requests.

Figure 1:
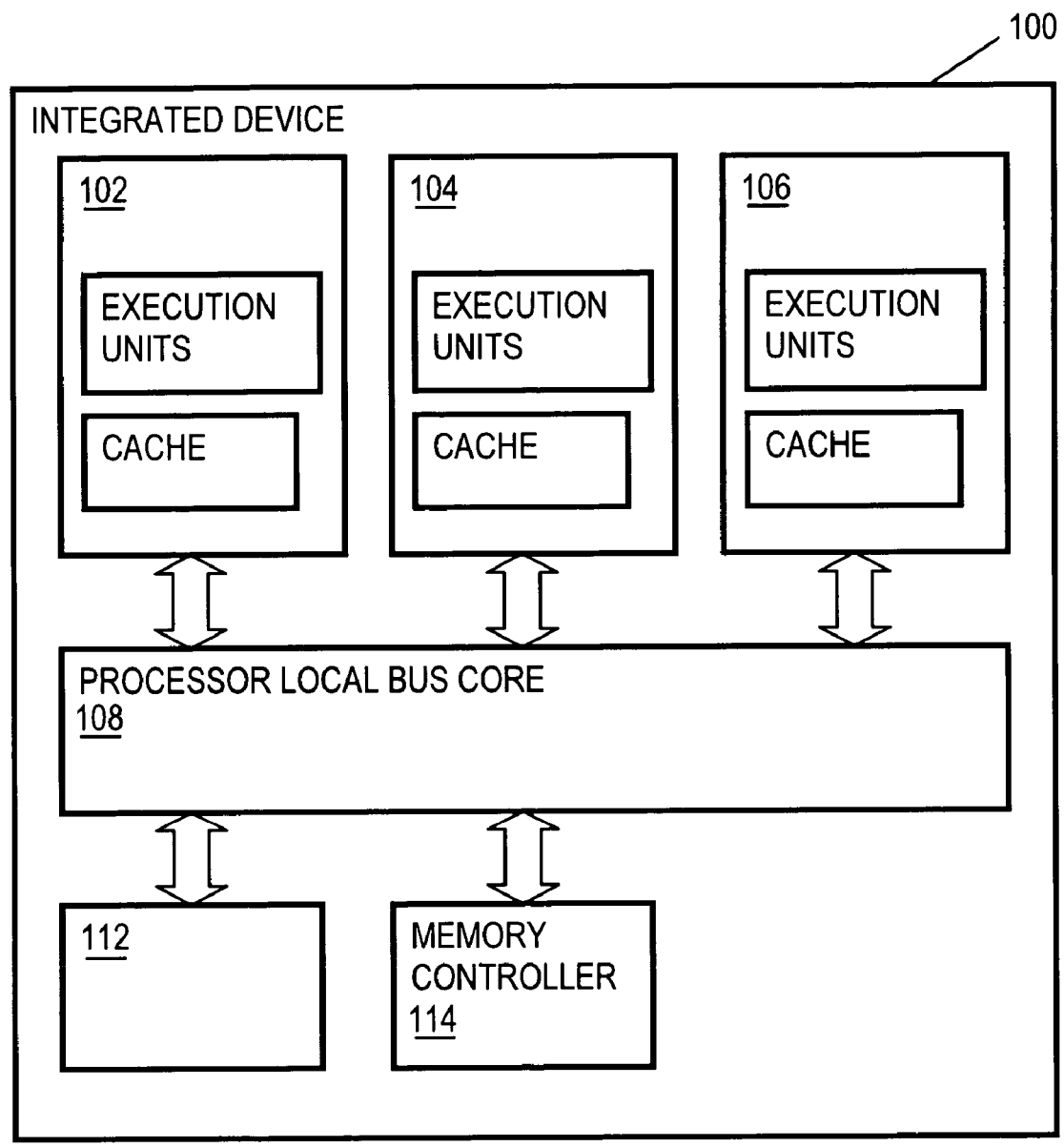
FIG. 1 depicts a system on a chip with a processor local bus core.

FIG. 1 depicts a typical integrated device, generally denoted 100, having a plurality of internal functional masters 102, 104, 106. Each master may be a processor with a cache and execution units. The masters connect to a processor local bus (PLB) with core logic and circuitry 108. The PLB also connects to a plurality of slave devices 112 and 114. A slave may be a memory system such as a memory system 114 with a memory controller (not shown). Other slaves may include a memory system that is external to integrated device 100. Masters may read data from a slave and write data to a slave through the PLB, under the control of PLB core 108. Thus, the PLB core contains circuitry to arbitrate read and write requests and facilitate data transfer between master and slave.

A master may be a processor, memory controller or other device. For example processor 102 may comprise other elements not shown such as an instruction fetcher, instruction buffer, dispatch unit, etc. In operation, the instruction fetcher of the processor obtains instructions to be executed from system memory 114 and stores the instructions in its cache. The instruction fetcher executes a mapping function to map "real addresses" to an address in the cache. A real instruction address is the address within system memory where an instruction is stored. The processor's cache also stores data. Thus, a real address of a memory location in a slave may map into a cache address. For example, multiple memory addresses in the system memory will map into a single cache address. This dual memory system enables faster processing because the time required to access data and instructions from the cache is much less than the time required to access data and instructions from the more distant system memory. The instruction fetcher retrieves instructions from the cache and stores them in an instruction buffer. A dispatch unit transfers each instruction from the instruction buffer to the proper execution unit, e.g., an arithmetic/logic unit. In the course of operation, data may be transferred from the cache to registers of the processor and vice versa. Data may also be transferred between the cache and the slaves 112 and 114.

Integrated circuit 100 may comprise a plurality of processors including the just-listed elements and each processor may place read and write requests on the PLB. PLB core 108 coordinates requests to the slaves in the integrated device. For example, slave 112 may comprise an external bus controller which is connected to an external non-volatile memory, such as flash memory. Slave 114 may be a memory controller that connects to external or internal volatile memory, such as SDRAM or DRAM. In general, functional masters 102-106 share a common memory pool in this integrated design in order to minimize memory costs, and to facilitate the transfer of data between the masters. As such, all internal masters may have equal access to both non-volatile and volatile memory. Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory, it is common to move operating code to volatile memory and execute instructions from there when the integrated device is operational.

As shown in the example of FIG. 1, a plurality of processors, each having its own cache memory and execution units, may communicate with each other and the slaves through the PLB. To transfer data from a cache to system memory 114, a processor 102 issues a write request to PLB core 108 and places the data to be transferred on the PLB. PLB core 108 will execute the transfer of the data in response to the request. The request identifies memory system 114 as the slave to receive the data. The request also contains the address in memory system 114 where the data is to be stored. A memory controller of memory system 114 causes the memory to be addressed and causes the data received from the PLB to be written to memory at the specified address.

To transfer data from memory 114 to a processor's cache, the processor issues a read request to PLB core 108. The request identifies memory system 114 as the slave to provide the data. The request also contains the address in memory system 114 from where the data is retrieved. The memory controller of memory system 114 causes the memory to be addressed and causes the data at the address to be written to the PLB. The PLB then transfers this data to the processor that issued the write request.

Complications can arise when the data at an address in system memory is not as up-to-date as data in a processor's cache. Consider a situation where a first processor 102 issues a request to read a value from memory 114. It may occur that a second processor 104 has internally updated that value and stored the updated value in its internal cache. This renders the value in memory 114 old and therefore invalid. Desirably, a mechanism is provided to detect when this occurs and to then copy the updated value from the internal cache of the second processor 104 to the internal cache of the first processor 102, and to the memory 114. In this way, the system preserves memory coherency.

Conventionally, the updated value from the second processor is transferred to the first processor in two steps: first, the updated value from the second processor is copied to memory 114. Then the valued is copied from memory 114 to the internal cache of the first processor. In embodiments described herein, data intervention is possible to substantially simultaneously copy the updated value to the first processor and to memory 114. Because of the relatively long time it takes to write data to memory 114 and to read data from memory 114, writing the updated value directly from the first processor to the second processor substantially reduces the latency of the request. That is, the time between the issuance of the read request by the first processor and the time that the data is received by the first processor is substantially reduced.

Or consider the situation when the first processor issues a write request to write data value to memory 114 but a second processor has a more up-to-date version of the data value. Embodiments may detect this condition as well and cause the updated value from the second processor, instead of the old value from the first processor, to be written to memory 114.

Figure 2:
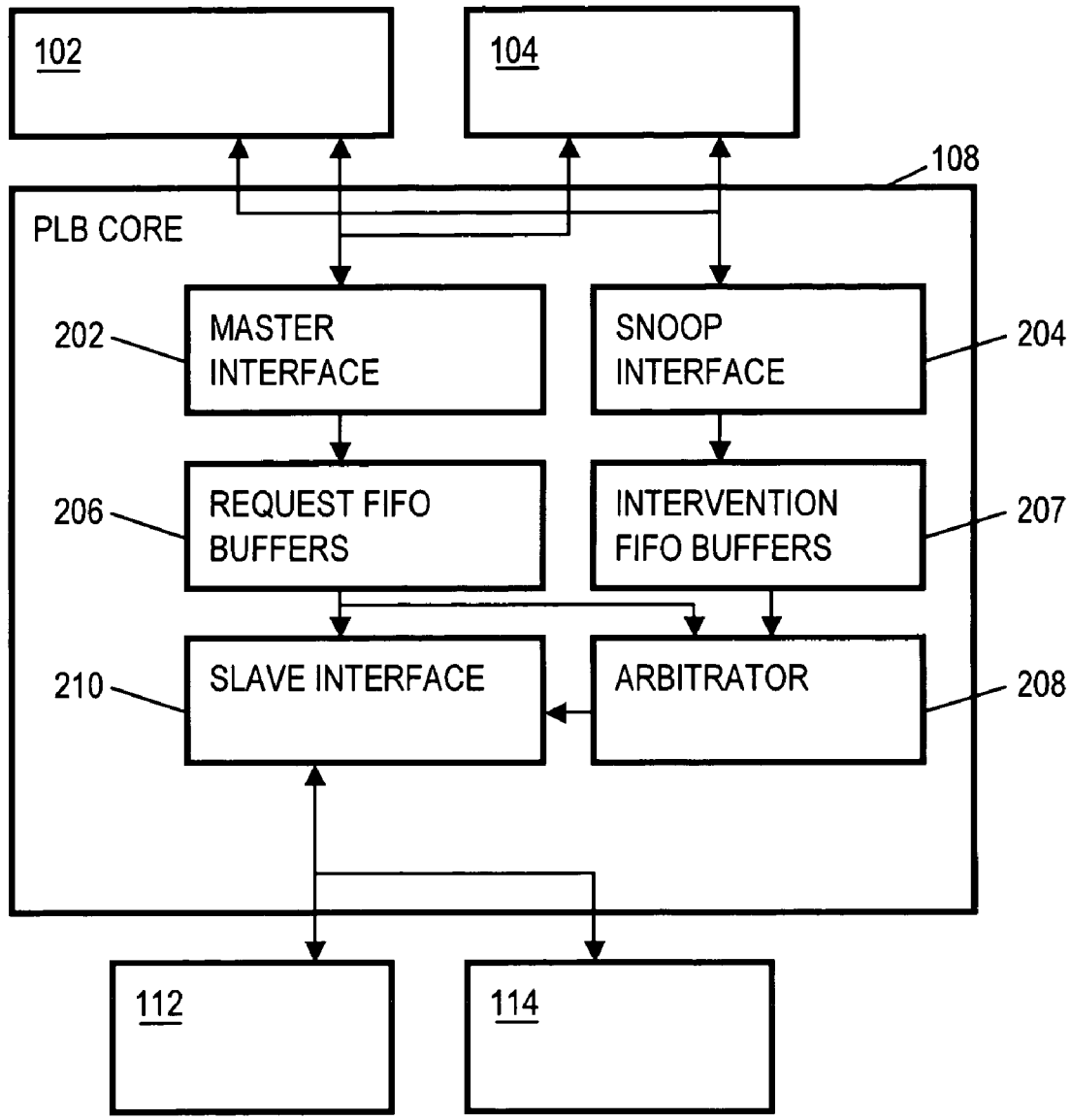
FIG. 2 depicts a block diagram of a processor local bus core.

FIG. 2 shows an embodiment of a PLB core 108 to enable multiple functional masters 102, 104 to communicate with multiple slaves 112, 114 over a shared bus. An example of this bus architecture is the Processor Local Bus (PLB) of the CoreConnect architecture marketed by International Business Machines Corporation of Armonk, N.Y. The masters within the architecture each have a unique master id (identification) which comprises part of the request signal that is sent to arbitrator 208 of PLB core 108. When multiple requests are presented, arbitrator 208 selects which request to process next according to a priority scheme, and sends an acknowledgment signal to the master that issued the selected request.

Arbitrator 208 also propagates the granted request to the slaves, along with the additional information needed, i.e., data address information and control information. As one example, the control information might include a read/write control signal which tells whether data is to be written from the master to the slave or read from the slave to the master. The data address signals pass through a first multiplexer (not shown), while the control signals pass through a second multiplexer (also not shown). Similarly, data to be written passes from the masters to the slaves through a multiplexer, and data read via the slaves returns to the masters through a multiplexer within PLB core 108. Further, a multiplexer multiplexes control signals from the slaves for return to the masters. These control signals may include, for example, status and/or acknowledgment signals. Conventionally, the slave to which a granted master request is targeted based on the address, responds to the master with the appropriate information. The multiplexers are controlled by arbitrator 208.

Thus, each of a plurality of masters, hereafter also referred to as processors, (although not limited to processors), can read data from a slave comprising a memory 114, or write data to the memory 114. PLB core 108 comprises a master interface 202. Master interface 202 receives requests from the processors and sends information, such as acknowledgment signals, to the processors. For example, a master may transmit a write request with data to be written to a slave, along with the identification of the slave to which the data is to be written and the slave address where the data is to be written within the slave. Or, a master may send a read request, along with the identification of the slave from which the data is to be obtained along with the address from where to obtain the data. In one example, the slave is a system memory accessible by a slave interface 210 of PLB core 108. The slave interface sends data to the system memory 114 or to slave 112 and receives data from the memory 114 or from slave 112.

Each request comprises certain qualifiers that characterize the request: whether the request is to read or write, whether the request is snoopable (to be explained subsequently), the slave ID, the master ID, etc. Each request from a processor 102, 104 is received by way of the master interface 202 and placed in a First-In-First-Out (FIFO) request buffer 206 corresponding to the processor making the request. Thus, associated with each processor is a particular one of a plurality of FIFO request buffers 206. These requests are handled in an order determined by an arbitrator 208 according to a priority scheme. For example, requests from a first processor may have priority over requests from a second processor. Requests may also be prioritized according to type of request, such as whether the request is snoopable. For example, non-snoopable requests may receive priority over snoopable requests.

A snoopable request is a request to read or write data from a slave device that is broadcast to one or more snoopable devices. A snoopable device is one that can determine whether it holds in its cache the requested data in a modified state. A snoopable device is connected to snoop interface 204 to enable transfer of data in a modified state from the snoopable device to the PLB. In some embodiments, not all devices are snoopable and therefore need not be connected to the snoop interface. Similarly, not all requests are snoopable requests and, hence, are not broadcast through the snoop interface. But when a snoopable request is received, it is broadcast through the snoop interface to the snoopable devices connected thereto. Each snoopable device will, in response to the broadcast request, determine if it holds the requested data in modified state. Only one processor can hold the data in modified state. The processor that holds the data in modified state, if any, notifies the PLB core, which then receives the requested data in modified state.

When a processor submits a request to the PLB, the request is placed in a FIFO buffer 206 for that processor. The request comprises a qualifier that indicates whether the request is snoopable. The request is handled in its turn by arbitrator 208. If the request is not snoopable, then the request is not broadcast to the snoopable processors, but rather, the request is handled by transferring the data that is the subject of the request directly to or from the requested slave through the PLB. If the request is snoopable, then the request is broadcast to the snoopable processors by way of the snoop interface 204.

When a snoopable processor receives a snoopable request through snoop interface 204, the processor receives the memory address of memory 114 that was provided by the processor that initiated the request. This memory address corresponds to a memory location in the processor's cache according to a mapping function that maps the addresses of memory 114 to processor cache addresses. The processor examines the cache entry corresponding to the memory address provided by the request. The processor determines by examining the entry whether the entry is the result of a recent modification or update that occurred since the value was last written to memory 114. Each cache entry has an indicator whether the data at that entry is in a modified state, indicating an updated value. Only one processor may have an updated value for the requested data. If the processor determines that its cache entry is an updated value, then the processor signals through the snoop interface to the PLB core 108 that an updated value exists in its cache. The processor then writes the updated value, hereafter referred to as the "castout" data, to PLB core 108 by way of snoop interface 204. The process of sending the castout data to the PLB core to be transferred to memory and to the requesting master is called a castout. The processor that sends the castout data alters the indicator for its cache entry to indicate that the data it holds is no longer in a modified state. The processor that receives the castout data alters its indicator to indicate that the data it now holds is modified data.

The castout data is written to a FIFO buffer 207 corresponding to the processor from which the castout data is obtained. Thus, PLB core 108 comprises two sets of FIFO buffers: (1) the FIFO buffers 206, one for each processor, that receive requests from the processors, and (2) the FIFO buffers 207, one for each snoopable processor, that receives castout data from the processor caches. Herein, the first set of buffers may be referred to as request buffers, and the second set of buffers may be referred to as intervention buffers. One of the request buffers 206 comprises request qualifiers from processor requests in the order they are received. This is referred to herein as the request order buffer. One of the intervention buffers 207 comprises castout qualifiers for castouts in the order that they are received. This is referred to herein as the castout order buffer. The request order buffer and the castout order buffer are used to reorder out-of-order castouts, as will be explained subsequently.

When castout data is to be handled, PLB core 208 must do several things. First, the castouts must be handled in the order requested, as determined from the request order buffer, even if the castouts are received by the PLB out of order. Second, the PLB core 208 must determine if data intervention is possible, and act on the castout data accordingly. Data intervention is the process of causing the updated data to be written to the requesting processor coincidentally with writing the updated data to memory, rather than writing first to memory and then writing from memory to the requesting processor.

Figure 3:
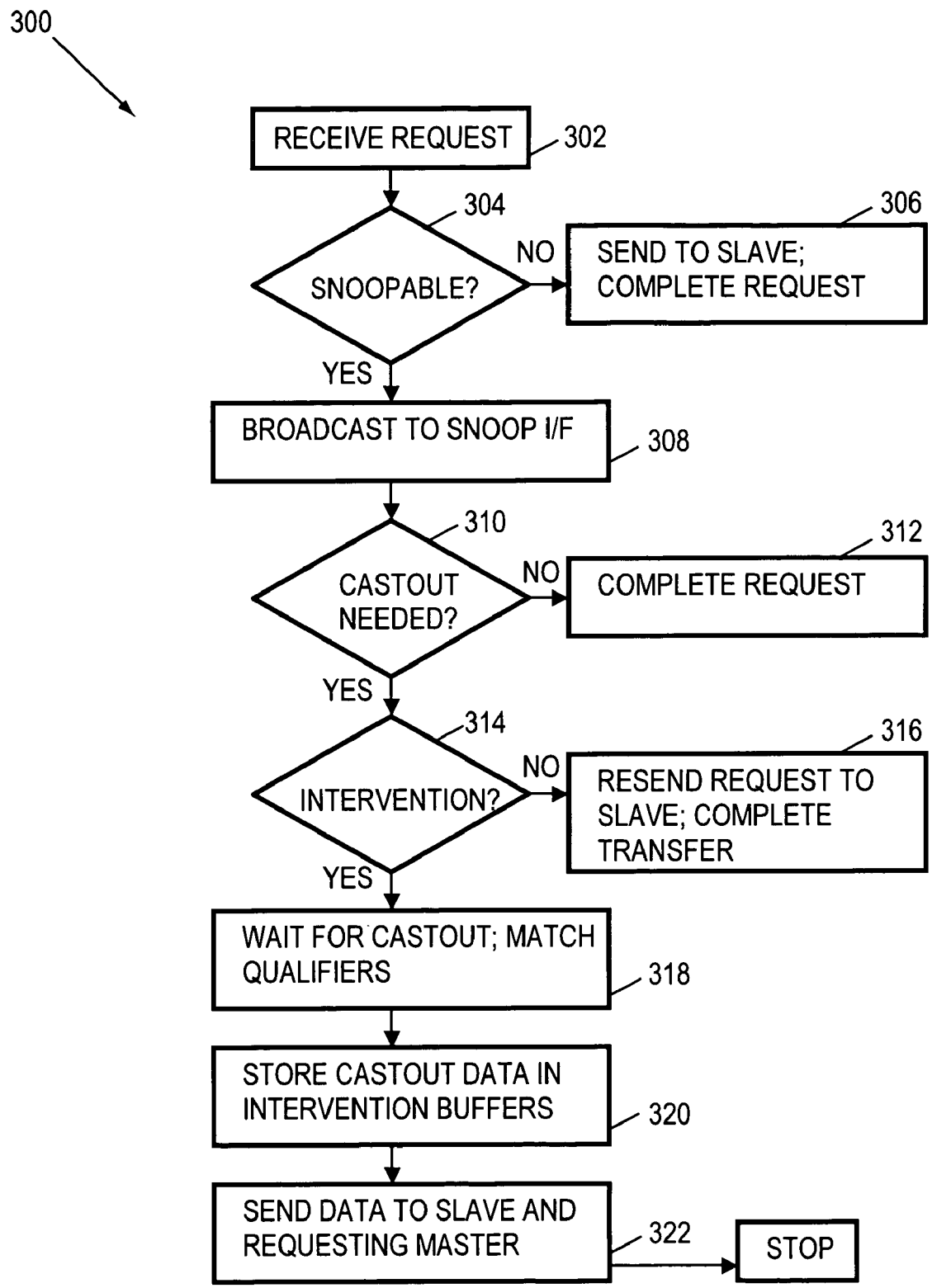
FIG. 3 depicts a flow chart of an embodiment for handling castouts.

FIG. 3 shows a flowchart 300 of an embodiment for handling castouts. When a request is received, (element 302), by the PLB core, the PLB core determines from a qualifier transmitted with the request whether the request is snoopable (element 304). If the request is not snoopable, the request is sent to the slave and the request is completed (element 306). If the request is a read request, then data is transferred from the slave to the requesting processor. If the request is a write request then the data is transferred from the requesting master to the slave. If the request is snoopable, then the request is broadcast through the snoop interface to the masters (element 308). If there is no castout (element 310), because no processor has an updated value of the requested data, then the request is completed (element 312) by reading the data from the requested slave or writing data to the requested slave.

If a processor indicates a castout (element 310), because it has an updated value of the requested data, then the PLB core determines whether to call for data intervention (element 314). As noted above, data intervention occurs when the PLB core writes the castout data to the requesting master directly from the PLB core, rather than from memory 114. Data intervention will not occur if, for example, the request is a write request. If a write request, then the snooped data is written to the slave (element 316). If the request calls for data intervention (element 314), the PLB core waits for the castout data to be received (element 318). When the processor transmits castout data to the PLB core, it also transmits a qualifier indicating to which request it corresponds. These qualifiers are matched to the request (element 318). The castout data is stored in an intervention buffer (element 320) corresponding to the processor that made the request. The castout data in an intervention buffer is sent in its turn to the slave (memory) and to the requesting processor (element 322).

Clearly, castouts may be received in an order different from the order in which requests are received that call for the castout data. The PLB core must therefore reorder the castouts. To accomplish this task, a request order buffer and a castout order buffer are provided. The request order buffer places the requests in order on a FIFO basis. The castout order buffer places the castouts in the order received on a FIFO basis. To understand the castout reordering process consider the following example. Suppose that a first request is from processor A, a second request is from processor B, and a third request is from processor C. Thus, the request order buffer may be depicted as follows:

where A is the first-out entry. Suppose further that a first castout is received for the request from processor C, a second castout is received for the request from processor B, and a third castout is received for the request from processor A. The castout order buffer may be depicted as:

where C is the first-out entry. To determine the correct order for handling the castouts, the PLB core logic compares each entry in the castout order buffer, in its turn, to the first-out entry of the request order buffer, until the qualifiers match. Thus, the PLB core logic compares the qualifiers of entry C of the castout order buffer to the qualifiers of entry A of the request order buffer. Since the qualifiers do not match, the system next compares the qualifiers of entry B of the castout order buffer to the qualifiers of entry A of the request order buffer. Since the qualifiers again do not match, the system next compares the qualifiers of entry A of the castout order buffer to the qualifiers of entry A of the request order buffer. Now the qualifiers match and entry A of the request order buffer is dequeued. Once dequeued, the request is completed by transferring the castout data to requesting processor A and to the memory.

Now the request order buffer may be depicted as:

| B | C | and the castout order buffer may be depicted, respectively, as follows:

| C | B |

Now entry C is the first-out entry of the castout order buffer. The qualifiers of entry C are compared to the qualifiers of entry B of the request order buffer. Since the qualifiers do not match, the system then compares the qualifiers of entry B of the castout order buffer to the qualifiers of entry B of the request order buffer. Now the qualifiers match and entry B of the request order buffer is dequeued. And so forth.

Thus, embodiments include a system on a chip, comprising a first device to submit requests to read data from a source device. The system includes a second device adapted to determine if it holds data requested by a read request from the first device in a modified state. A third device transfers data in a modified state from the second device to the first device without waiting for the requested data to be read from the source device. The first device may be adapted to determine if it holds data requested by the second device in a modified state and the second device may be adapted to submit requests to read data from the source device. Further, the system may comprise an arbitrator to determine an order of transfer by the third device as a function of the order of requests received by the first device.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for handling transfer of cast out data from source devices to requesting devices in an integrated circuit, comprising:
   receiving by a processor local bus a plurality of requests from requesting devices to read data from a common memory shared by multiple source devices and the requesting device; wherein a line in the common memory maps to a line in the caches of more than one source device; and wherein the requests are stored in a queue of the processor local bus in an order received;
   communicating each snoopable request to one or more source devices in the integrated circuit by way of the processor local bus, so that the one or more source devices may each determine if it is the one that holds the requested data in a modified state, the one determined to hold the data in modified state casting out the data to the processor local bus;
   receiving into a queue of the processor local bus the castout data in the order the data is castout from the source devices in response to snoopable requests;
   reordering by the processor local bus, out of order cast out data in the determined order of received requests; and
   for each snoopable request, transferring by way of the processor local bus, in an order of received requests, cast out data to respective requesting devices, while simultaneously writing by way of the processor local bus the cast out data to the common memory so that line is available to other source devices, the simultaneous transfer to avoid a long latency associated with writing the cast out data to the common memory first and then reading the cast out data from the common memory.

2. The method of claim 1, wherein a plurality of the one or more source devices are accessible by a snoop interface.

3. An integrated circuit, comprising:
   a plurality of processors in the integrated circuit each adapted to request to read data from a shared common memory, wherein the plurality of processors share the common memory by way of a processor local bus coupled to the processors and to the common memory; and wherein a line in the common memory maps to a line in caches of more than one processor;
   at least one of the processors adapted to determine if it holds requested data in a modified state in response to a snoopable request communicated to the at least one processor and to cast out the requested data in a modified state if it is held by the processor; and
   a processor local bus:
      to receive requests from requesting processors to read data from the common memory, to store the received requests in a queue in the order received, and to communicate snoopable requests to the at least one processor;
      to receive cast out data from a processor if the processor determines that it holds requested data in a modified state, to store cast out data in an order received from processors that cast out data in response to requests, and to reorder the cast out data in an order of received requests; and
      to transfer the cast out data, in an order of received requests, to the device that requested the data while simultaneously transferring the cast out data to the common memory, and without waiting for the data to be read from the common memory from which data was requested.

4. The integrated circuit of claim 3, wherein the processor local bus further comprises circuitry to write the data in a modified state to the common memory.

5. The integrated circuit of claim 3, wherein a processor controls a memory external to the integrated circuit.

6. A multi-processor system on a chip, comprising:
   a common memory accessible to a plurality of processors so that a line in the common memory maps to a line in the caches of the processors;
   a plurality of processors, each capable of transmitting snoopable requests for data to a processor local bus, receiving snooped data, and transmitting cast out data to the processor local bus in response to a snoopable request; and a processor local bus comprising a queue to store requests in an order received from processors, a queue to store cast out data in an order received from processors, a reorder mechanism to reorder cast out data to be in an order of received requests.

7. The system of claim 6, further comprising a mechanism within the processor local bus to simultaneously write requested data to both the processor that requested the data and the common memory.

8. The system of claim 6, wherein the processor local bus further comprises an arbiter to write cast out data to processors that requested the data in an order of received requests.

9. The system of claim 6, wherein the processor local bus further comprises a snoop interface to transfer snooped data to a requesting device and a slave interface to simulataneously transfer the snooped data to the common memory.

10. The system of claim 6, wherein the processor local bus further comprises a master interface to receive requests from the processors and a snoop interface to provide snooped data to the processors.

11. The circuit of claim 3, wherein the processor local bus further comprises a snoop interface to transfer snooped data to a requesting processor and a slave interface to simultaneously transfer the snooped data to the common memory.

12. The circuit of claim 3, wherein the processor local bus further comprises an arbiter to write cast out data to processors that requested the data in an order of received requests.

13. The circuit of claim 3, wherein the processor local bus further comprises a master interface to receive requests from the processors and a snoop interface to provide snooped data to the processors.

14. The method of claim 1, further comprising providing a snoop interface to transfer snooped data to a requesting device and a slave interface to simultaneously transfer the snooped data to the common memory.

15. The method of claim 1, further comprising providing a master interface to receive snoopable requests from the requesting devices and to transfer the snoopable requests to source devices.

* * * * *